United States Patent [19]
Teranishi

[11] Patent Number: 5,528,435
[45] Date of Patent: Jun. 18, 1996

[54] DISK DRIVE HAVING A PIVOTAL SUPPORT STRUCTURE CAPABLE OF DEFINING A UNIQUE POSITION OF A SUPPORT MEMBER ON A LOWER SURFACE OF A DISK HOLDING TABLE

[75] Inventor: Kouji Teranishi, Atsugi, Japan

[73] Assignee: Mitsumi Electric Co., Ltd., Tokyo, Japan

[21] Appl. No.: 315,931

[22] Filed: Sep. 29, 1994

[30] Foreign Application Priority Data

Sep. 30, 1993 [JP] Japan .............................. 5-053136 U

[51] Int. Cl.$^6$ .................................................. G11B 17/02
[52] U.S. Cl. ............................................................ 360/99.04
[58] Field of Search ............................... 360/99.04, 99.08

[56] References Cited

U.S. PATENT DOCUMENTS 5,121,272 6/1992 Maekawa et al. ..................... 360/99.04
5,264,978 11/1993 Sakaguchi ............................. 360/99.04

*Primary Examiner*—Robert S. Tupper
*Attorney, Agent, or Firm*—Frishauf, Holtz, Goodman, Langer & Chick

[57] ABSTRACT

A disk driver having a pivotal support structure capable of defining a unique position of a support member has a disk holding table (10) and a support member (12) assembled to a lower surface thereof. The support member (12) is provided with an insertion hole (12b) formed at one end thereof. The insertion hole (12b) has a shape of an elongated hole extending along an imaginary line (L) between a center axis of the driving roller (15) and a center axis of a support pin (14). The elongated hole has a nonuniform width in a transversal direction perpendicular to the imaginary line (L). The width gradually reduces towards the driving roller (15) and is smaller and greater than a diameter of an engaging end (14a) of the support pin (14) at a closest portion closest to the driving roller (15) and at a remotest portion remotest from the driving roller (15), respectively. Following the movement of the support member (12) during rotation of the disk holding table (10) in a direction from the support pin (14) towards a driving roller (15), a circumferential wall defining the insertion hole (12b) is substantially brought into two-line contact (P1, P2) with a peripheral side wall of the engaging end (14a) of the support pin (14).

1 Claim, 4 Drawing Sheets

DISK DRIVE HAVING A PIVOTAL SUPPORT STRUCTURE CAPABLE OF DEFINING A UNIQUE POSITION OF A SUPPORT MEMBER ON A LOWER SURFACE OF A DISK HOLDING TABLE

BACKGROUND OF THE INVENTION

This invention relates to a disk driver having a disk holding table for holding and rotating a disk such as a magnetic disk and, more particularly, to a disk driver having a pivotal support structure capable of defining a unique position of a support member arranged on a lower surface of a disk holding table.

In a disk driver of the type described, a disk holding table is provided with a circular engaging hole and a circular driving hole formed at different positions eccentric with a center of the disk holding table. To a lower surface of the disk holding table, a support member is attached by the use of the engaging hole and the driving hole.

The support member has one end provided with an insertion hole for insertion of a support pin. The support pin has an engaging end inserted through the insertion hole of the support member to be received in the engaging hole of the disk holding table. Thus, the support member is pivotally supported through the support pin to be rotatable with respect to the disk holding table. The other end of the support member opposite to the one end is a free end to which a driving roller is rotatably attached. The driving roller is upwardly protruded through the driving hole of the disk holding table.

It is noted here that the engaging end of the support pin allows the support member to be rotated in a radial direction of the disk holding table and to be displaced in an axial direction (vertical direction) of the support pin itself. Thus, a pivotal support structure is formed. In such a pivotal support structure, the insertion hole formed at the one end of the support member has a diameter greater than that of the engaging end of the support pin. This results in presence of a gap between a peripheral side wall of the engaging end of the support pin and a circumferential wall defining the insertion hole.

When such a gap is present, the support pin is displaced within the insertion hole following the movement of the support member so that the peripheral side wall of the engaging end of the support pin is brought into contact with the circumferential wall of the insertion hole along a single vertical line, namely, at a single point in a sectional plane. This is because each of the support pin and the insertion hole has a generally circular section. Throughout the specification, such contact is referred to as a single-line contact and sometimes as a single-point contact. In case of the single-point contact, a point of contact is shifted from place to place in accordance with variation of a force applied to the support member. Therefore, it is impossible to define a unique position of the support member. As a result, unfavorable wobbling of the disk holding table can not be sufficiently suppressed.

SUMMARY OF THE INVENTION

It is therefore an object of this invention to provide a disk driver having a pivotal support structure which is capable of defining a unique position of a support member by bringing a peripheral side wall of an engaging end of a support pin into two-line contact with a circumferential wall defining an insertion hole of the support member.

According to this invention, there is provided a disk driver having a disk holding table for holding a disk and a support member assembled to a lower surface of the disk holding table by the use of a support pin, the disk holding table being provided with an engaging hole and a driving hole formed at different positions eccentric with a center of the disk holding table, the support member having one end provided with an insertion hole through which an engaging end of the support pin is inserted to be received in the engaging hole of the disk holding table while the other end of the support member carries a driving roller so that the driving roller is protruded through the driving hole of the disk holding table, the support member being vertically movably and rotatably supported by the support pin attached to the disk holding table, wherein a circumferential wall defining the insertion hole of the support member is substantially brought into two-line contact with a peripheral side wall of the engaging end of the support pin following the movement of the support member during rotation of the disk holding table in a direction from the support pin towards the driving roller.

According to this invention, in the above-mentioned disk driver, the insertion hole has a configuration of an elongated hole extending along an imaginary line between a center axis of the driving roller and a center axis of the support pin, the elongated hole having a nonuniform width in a transversal direction perpendicular to the imaginary line, the width of the elongated hole gradually reducing towards the driving roller and being smaller and greater than a diameter of the engaging end of the support pin at a closest portion closest to the driving roller and at a remotest portion remotest from the driving roller, respectively.

DESCRIPTION OF THE PREFERRED EMBODIMENTS

Prior to description of a specific embodiment of this invention, a conventional disk driver will first be described with reference to FIGS. 1 and 2 in order to facilitate an understanding of this invention.

Figure 1:
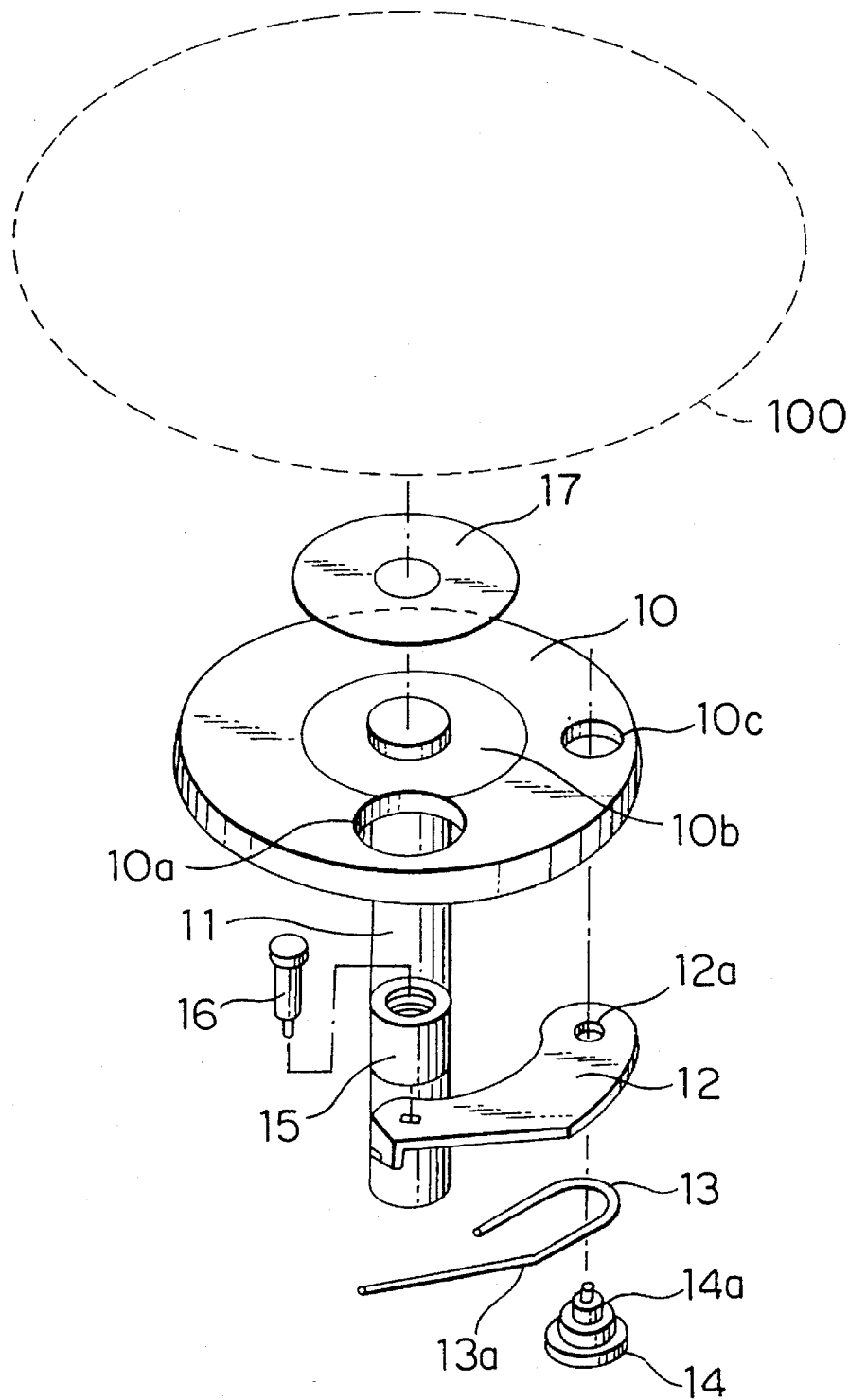
FIG. 1 is an exploded perspective view of a main portion of a conventional disk driver.

In a disk driver illustrated in FIG. 1, a disk holding table 10 for holding a disk 100 is integrally formed with a motor shaft 11 by insert molding of a plastic magnet material. The disk holding table 10 is provided with a circular driving hole 10a and a circular engaging hole 10c formed at different positions eccentric with a center of the disk holding table 10. A support member 12 is attached to a lower surface of the disk holding table 10 by the use of the driving hole 10a and the engaging hole 10c.

The support member 12 is provided with an insertion hole 12a formed at one end thereof for insertion of a support pin 14. Through the insertion hole 12a, an engaging end 14a of the support pin 14 is inserted to be received in the engaging hole 10c of the disk holding table 10. In this state, the support member 12 is rotatably pivoted with respect to the disk holding table 10. A rod spring 13 is interposed between the support pin 14 and the support member 12. The rod spring 13 has a top end engaged with the one end of the support member 12 to thereby urge the support member 12 in a radial direction of the disk holding table 10. Furthermore, the rod spring 13 has an intermediate portion 13a upwardly bent to thereby urge the support member 12 upward. Thus, the support member 12 is outwardly urged from the center of the disk holding table 10.

The other end of the support member 12 opposite to the one end is a free end to which a driving roller 15 is rotatably attached through a roller shaft 16. The driving roller 15 is upwardly protruded through the driving hole 10a of the disk holding table 10.

A Teflon (polytetrafluoroethylene) tape 17 is placed on a circular protrusion 10b of the disk holding table 10 to facilitate sliding of a metal disk hub (not shown) assembled to the disk 100.

Figure 2:
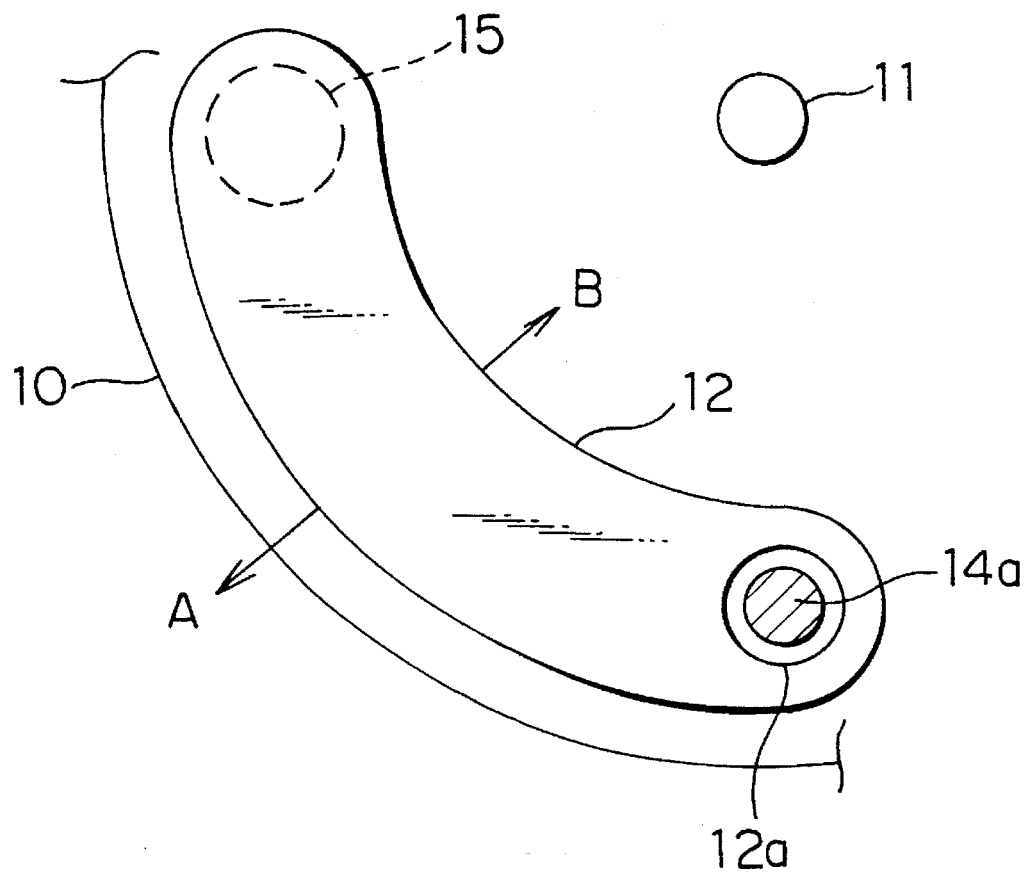
FIG. 2 is a plan view for describing a pivotal support structure in a support member of the disk driver illustrated in FIG. 1.

In the meanwhile, the engaging end 14a of the support pin 14 allows the support member 12 to rotate in a direction depicted by each of arrows A and B in FIG. 2, namely, the radial direction of the disk holding table 10. In addition, the support member 12 is displaceable in an axial direction (vertical direction) of the support pin 14 itself. Thus, a pivotal support structure is formed. In such a pivotal support structure, the insertion hole 12a formed at the one end of the support member 12 has a diameter greater than that of the engaging end 14a of the support pin 14. Accordingly, a gap is present between a circumferential wall of the insertion hole 12a and a peripheral side wall of the engaging end 14a of the support pin 14a.

When such gap is present between the circumferential wall of the insertion hole 12a and the peripheral side wall of the engaging end 14a of the support pin 14 as described above, the support pin 14 is displaced within the insertion hole 12a following the movement of the support member 12 so that the peripheral side wall of the engaging end 14a of the support pin 14 is brought into single-point or single-line contact with the circumferential wall of the insertion hole 12a of the support member 12. If a force acting on the support member 12 is varied in such single-point contact, the point of contact is shifted from place to place. As a result, the support member 12 can not be stably placed at a unique invariable position.

Figure 3:
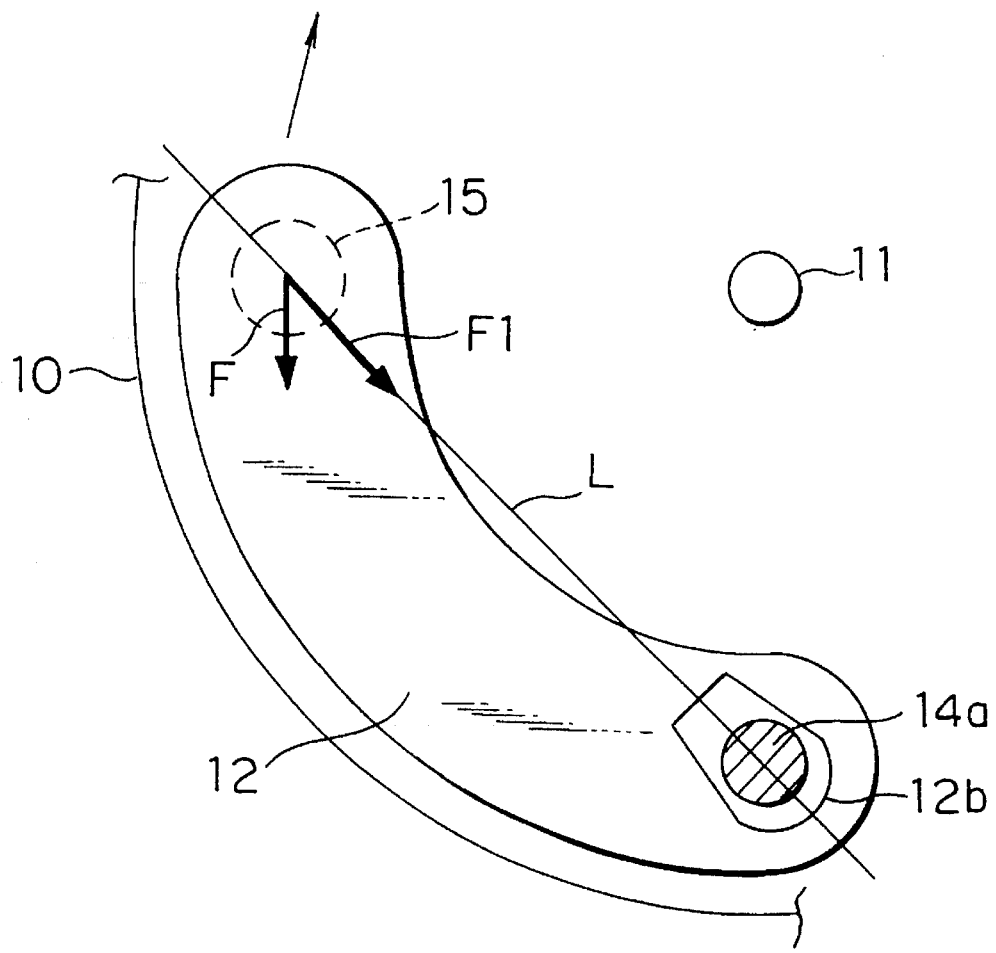
FIG. 3 is a plan view for describing one condition with respect to a pivotal support structure in a support member of a disk driver according to one embodiment of this invention.
Figure 4:
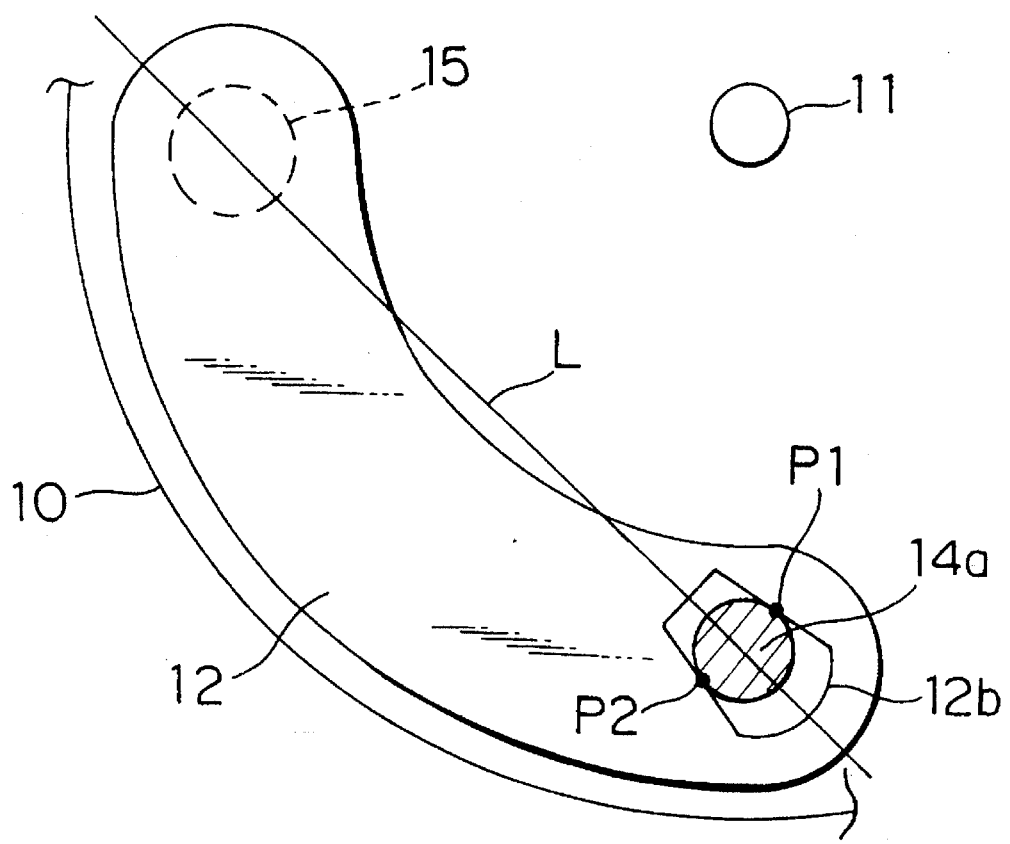
FIG. 4 is a plan view for describing the other condition with respect to the pivotal support structure in the support member of the disk driver according to the one embodiment of this invention.

Now, description will proceed to a disk driver according to one embodiment of this invention with reference to FIGS. 3 and 4. The disk driver according to this invention has similar components similar to those of the conventional disk driver described in conjunction with FIG. 1. Therefore, the similar parts are designated by like reference numerals and will not be described any longer.

At first referring to FIG. 3, in the disk driver according to this invention, the support member 12 assembled to the lower surface of the disk holding table 10 has an insertion hole 12b formed at one end thereof and having a shape different from that of the insertion hole 12a illustrated in FIG. 2.

The insertion hole 12b has a configuration of an elongated hole extending along an imaginary line L between a center axis of the driving roller 15 and a center axis of the support pin 14. The elongated hole has a nonuniform width in a transversal direction perpendicular to the imaginary line L. The width gradually reduces towards the driving roller 15.

The width is smaller and greater than the diameter of the engaging end 14a of the support pin 14 at a closest portion closest to the driving roller 15 and at a remotest portion remotest from the driving roller 15, respectively.

With the movement of the support member 12 during rotation of the disk holding table 10 in a direction from the support pin 14 towards the driving roller 15 as depicted by a thin arrow in FIG. 3, the support pin 14 is displaced within the insertion hole 12b having the above-mentioned configuration. As a consequence, a circumferential wall defining the insertion hole 12b is brought into contact with the peripheral side wall of the engaging end 14a of the support pin 14 along two vertical lines, namely, at two points in a sectional plane. Such contact is referred to as a two-line contact or a two-point contact throughout the specification and the appended claims. The movement will later be described in detail.

The driving roller 15 rotates and changes its position within the driving hole 10a. It is noted here that, in determining the imaginary line L, a reference position of the driving roller 15 is defined at a particular position which will presently be described. During rotation of the disk holding table 10, the driving roller reaches a position where it is clamped by a circumferential wall of a driving hole (not shown) formed in the disk hub of the disk 10 (FIG. 1) and a circumferential wall of the driving hole 10a formed in the disk holding table 10. At that position, the driving roller 15 is kept in a fixed state (called a chucking condition) with respect to the disk holding table 10.

Description will proceed to the movement of the support member 12 in the pivotal support structure utilizing the insertion hole 12b of an elongated shape. In FIG. 3, the peripheral side wall of the engaging end 14a of the support pin 14 is not in contact with any portion of the circumferential wall of the insertion hole 12b the support member 12. When the disk holding table 10 starts its rotation in a rotating direction depicted by the thin arrow in the figure, a reactive force F is applied to the driving roller 15 in a direction reverse to the rotating direction. The support member 12 is subjected to a force component F1 of the reactive force F to be moved along the imaginary line L. The support pin 14 attached to the disk holding table 10 is relatively displaced so that the engaging end 14a of the support pin 14 is moved within the insertion hole 12b towards the closest portion closest to the driving roller 15, namely, towards a portion having the narrowest width.

Accordingly, as illustrated in FIG. 4, the peripheral side wall of the engaging end 14a of the support pin 14 is brought into contact with the circumferential wall of the insertion hole 12b along two vertical lines depicted by two points P1 and P2 in a sectional plane of FIG. 4. With such two-point or two-line contact, the support member 12 is stably positioned as compared with the conventional single-line contact. Specifically, the points of contact between the peripheral side wall of the engaging end 14a of the support pin 14 and the circumferential wall of the insertion hole 12b are not shifted but fixed at the two points P1 and P2 even if the support member 12 is subjected to an external force in any direction. Thus, the support member 12 is stably placed at a unique invariable position.

It will be understood that the pivotal support structure illustrated in FIGS. 3 and 4 are applicable not only to the disk driver having the structure illustrated in FIG. 1 but also to any of those disk drivers in which the driving roller 15 is supported by the support member 12 rotatable with respect to the disk holding table 10. For example, in the disk driver illustrated in FIG. 1, the disk holding table 10 is formed from the plastic magnet material so as to attract the disk hub and the support member 12 made of metal. However, the disk holding table 10 may be made from the plastic material and combined with a permanent magnet. In the above-mentioned embodiment, the insertion hole 12*b* of the support member 12 has a configuration of an elongated hole symmetric with the imaginary line L. However, the insertion hole 12*b* may be formed into any other appropriate shape.

As described above, the disk driver according to this invention achieves the improved pivotal support structure in supporting the support member 12 by the support pin 14. With the movement of the support member 12, the peripheral side wall of the engaging end 14*a* of the support pin 14 is substantially brought into two-line contact with the circumferential wall of the insertion hole 12*b*. Thus, the support member 12 is stably placed at a unique position. It is therefore possible to sufficiently suppress wobbling of the disk holding table 10.

What is claimed is:

1. A disk driver comprising:

a disk holding table for holding a disk; and a support member assembled to a lower surface of said disk holding table by means of a support pin;

said disk holding table having an engaging hole and a driving hole formed at different positions eccentric with a center of said disk holding table;

said support member having one end provided with an insertion hole through which an engaging end of said support pin is inserted so as to be received in said engaging hole of the disk holding table while another end of said support member carries a driving roller so that said driving roller is protruded through said driving hole, said support member being vertically movably and rotatably supported by said support pin attached to said disk holding table, and wherein:

a circumferential wall defining said insertion hole of said support member is substantially brought into two-line contact with a peripheral side wall of said engaging end of said support pin, following movement of said support member during rotation of said disk holding table in a direction from said support pin towards said driving roller, and said insertion hole has a configuration of an elongated hole extending along an imaginary line between a center axis of said driving roller and a center axis of said support in, said elongated hole having a nonuniform width in a transverse direction perpendicular to said imaginary line, said width gradually reducing towards said driving roller and being smaller and greater than a diameter of said engaging end of said support pin at a closest portion closest to said driving roller and at a remotest portion from said driving roller, respectively.

* * * * *